United States Patent [19]

Van Der Jagt et al.

[11] Patent Number: 4,805,197

[45] Date of Patent: Feb. 14, 1989

[54] METHOD AND APPARATUS FOR RECOVERING CLOCK INFORMATION FROM A RECEIVED DIGITAL SIGNAL AND FOR SYNCHRONIZING THAT SIGNAL

[75] Inventors: Lourens Van Der Jagt, Woodbury; Gunther Martin, Ridgefield, both of Conn.; Wolf S. Landmann, Fair Lawn, N.J.

[73] Assignee: LeCroy Corporation, Chestnut Ridge, N.Y.

[21] Appl. No.: 944,249

[22] Filed: Dec. 18, 1986

[51] Int. Cl.⁴ .......................... H04L 7/02; H04L 27/22
[52] U.S. Cl. ...................................... 375/110; 375/87; 375/120
[58] Field of Search ................... 375/87, 95, 110, 120; 360/51

[56] References Cited

U.S. PATENT DOCUMENTS

| | | |
|---|---|---|
| 3,893,617 | 7/1975 | Solberg .................................. 371/62 |
| 4,109,276 | 8/1978 | Hopkins, Jr. et al. .......... 375/118 X |
| 4,119,796 | 10/1978 | Jones ................................ 375/118 X |
| 4,167,760 | 9/1979 | Decker . |
| 4,185,273 | 1/1980 | Gowan . |
| 4,222,116 | 9/1980 | Groves . |
| 4,270,183 | 5/1981 | Robinson et al. ................ 375/118 X |
| 4,281,292 | 7/1981 | Caldarella et al. . |
| 4,313,206 | 1/1982 | Woodward .......................... 375/110 |
| 4,317,211 | 2/1982 | Quesnell . |
| 4,322,850 | 3/1982 | Antonini et al. . |
| 4,355,398 | 10/1982 | Cook ............................... 375/118 X |
| 4,361,895 | 11/1982 | Khoudari . |
| 4,426,714 | 1/1984 | Ashida . |
| 4,513,427 | 4/1985 | Borriello et al. ..................... 375/110 |
| 4,525,848 | 6/1985 | Simpson . |
| 4,531,223 | 7/1985 | Ashida . |
| 4,542,420 | 9/1985 | Kozlik et al. . |
| 4,578,799 | 3/1986 | Scholl et al. . |
| 4,592,072 | 5/1986 | Stewart . |
| 4,596,026 | 6/1986 | Cease et al. ......................... 375/118 |
| 4,617,659 | 10/1986 | Chopping et al. .............. 375/118 X |

Primary Examiner—Stephen C. Buczinski
Assistant Examiner—Linda J. Wallace
Attorney, Agent, or Firm—Curtis, Morris & Safford

[57] ABSTRACT

Inherent clock information included in a digital signal of the type in which binary information is represented by signal level transistions which are present on a periodic basis, such as a signal level transistion at a mid-location of a bit interval, is recovered by generating a pulse at each signal level transition, delaying that pulse by a half bit interval and by a full bit interval, respectively, and summing the generated, the half bit delayed and the full bit delayed pulses to recover the clock information. The recovered clock is used to write each binary level included in the received digital signal into a memory from which each stored binary level is read at a reference clock rate. Loss of synchronization between the received and read-out digital signals is detected by sensing a differential of predetermined magnitude in the write-in and read-out rates. Preferbly, the detected differential in these rates is used to adjust the read clock rate in a direction which tends to null that differential, thereby restoring synchronism between the read out and written in digital signals.

42 Claims, 1 Drawing Sheet

METHOD AND APPARATUS FOR RECOVERING CLOCK INFORMATION FROM A RECEIVED DIGITAL SIGNAL AND FOR SYNCHRONIZING THAT SIGNAL

BACKGROUND OF THE INVENTION

This invention relates to a method and apparatus for recovering clock information from a received digital signal and, more particularly, to a relatively simple yet accurate technique for recovering inherent clock information from a digital signal in which binary information is represented by signal level transitions which are present on a periodic basis, such as a transition at a mid-location of a bit interval. The present invention further relates to a technique by which the digital signal is re-synchronized; and the recovered clock information is used to detect loss of synchronism and to control the resynchronizing operation.

Various data communication techniques call for the resynchronizing of digital information which is transmitted from one location and received at another, remote location. Such resynchronizing, or re-clocking, is intended merely to restore the original transmission rate which, because of various factors, might be subjected to time delays, phase shifts, and other deviations. This need for resynchronizing a digital signal is most notable in long distance digital transmission systems, systems in which the transmission medium might change, and so-called network transmission systems (such as local area networks) in which a common transmission bus is connected to several stations. In systems of the aforementioned type, it often is desirable to re-clock the digital signal to restore its original transmission rate. In other systems, however, it may be desirable to re-clock the digital signal to a new transmission rate which may be greater (or less than) the original.

A change in the transmission medium in a digital signal communication system is encountered when fiber optic media are used. The advantages of using a fiber optic transmission link in place of conventional conductors (such as coaxial cables) are sufficiently known and understood as to require no further description herein. Since a fiber optic transmission link interconnects electrical transmitting and receiving devices which operate upon conventional electrical signals as opposed to light, a conversion of electrical parameters to optical parameters, and vice versa is needed. Fiber optic links utilize electro-optic repeaters, often referred to simply as modems (or modulator-demodulator devices) in which re-clocking is carried out. Typically, a re-clocking operation is employed on the converted electrical signal at a receiving station, or repeater, at which a fiber optic transmission link terminates. Then, the re-clocked digital signal is reconverted back to optical form and transmitted to the next receiver or repeater.

Other examples of a change in transmission medium which suggests the need for a repeater or modem to carry out a re-clocking operation include radio wave transmission converted to transmission over electrical conductors; a wave guide-to-coaxial cable interface; and the like.

To enhance the re-clocking of digital signals, such as the re-clocking found in repeaters, modems, and the like, as mentioned above, various so-called "self-clocking" codes have been proposed. Typically, these codes are used to represent binary signals, or bits, by providing signal level transitions at or in the vicinity of the mid-location of each bit interval of the digital signal. One of these codes, known as the Manchester code, represents a binary "1" by a positive-going transition at the mid-location of a bit interval, and a binary "0" is represented by a negative-going transition. In another code, known as a differential code, the binary "0" is represented by a signal level transition at the mid-location of a bit interval which is of opposite polarity to the transition which immediately preceded it. A binary "1" is represented in this code as a signal level transition of the same polarity as that which just preceded it. These codes are known as self-clocking codes because the signal level transitions represent not only binary information but also the clock rate at which that binary information is encoded (or transmitted). Other self-clocking codes include the phase coherent code, the alternate mark inversion (AMI) code and the split phase code.

To receive a self-clocking encoded digital signal accurately, without ambiguity as to the nature of each bit included therein, it is important to recover the clock information which inherently is encoded in that signal. Of course, the recovery of such clock information is needed to resynchronize the digital signal for re-transmission. However, techniques which have been used heretofore to recover that clock information are subjected to ambiguity. This is because of apparent changes in the clock rate (or repetition rate) of many self-clocking encoded signals. For example, in a Manchester encoded signal, successive bits of the same polarity (e.g. two or more successive binary "0"s or two or more successive binary "1"s) exhibit twice the repetition rate of alternating "1"s and "0"s. Because of this characteristic, it is not enough merely to detect signal level transitions in the received digital signal as a representation of the clock information included therein. In the case of repeated bits of the same polarity, a signal level transition will occur both at the mid-location of a bit interval as well as at the end (or beginning) of that interval. Hence, if clock pulses are generated solely in response to each signal level transition in the digital signal, an "extra" clock pulse will be produced for each bit interval when repeated bits of the same polarity are present.

When using a common bus coupled to several stations (each of which may include a repeater or a modem), control circuitry is provided to prevent ambiguity in the event that two (or more) stations wish to seize the bus at precisely the same time. Such control techniques prevent so-called "collision" when more than one station transmits simultaneously to the bus. Although multiplexing arrangements may be used to interleave signals from various stations, simultaneous transmissions of a bit at the very same time are avoided. However, collisions may occur; and it is important to prevent the re-transmission of errors and distortions due to such collisions. It is important, therefore, to detect collisions so as to prevent re-transmitted distortions. In this regard, it has been found that a collision will cause the apparent repetition rate of a received digital signal to differ significantly from the expected repetition rate.

OBJECTS OF THE INVENTION

Therefore, it is an object of the present invention to avoid the aforenoted defects and disadvantages associated with clock recovery techniques, collision sensing techniques and digital signal re-clocking techniques.

Another object of this invention is to provide an improved method and apparatus for recovering clock information from a received self-clocking digital signal.

A further object of this invention is to provide an improved method and apparatus for re-clocking, or re-synchronizing, a received digital signal.

An additional object of this invention is to provide an improved re-clocking technique, as aforementioned, which finds particular application to self-clocking encoded signals, such as Manchester and phase coherent encoded signals.

Yet another object of this invention is to provide an improved method and apparatus for sensing collisions of data transmitted by two or more stations.

A still further object of this invention is to provide an improved method and apparatus for sensing a significant change in the repetition rate of a received digital signal, this possibly being indicative of a data collision.

Another object of this invention is to provide a method and apparatus for re-synchronizing a received digital signal, for sensing loss of synchronism between the received and re-synchronized signals and to provide an indication of the possible occurrence of a data collision.

Various other objects, advantages and features of the present invention will become readily apparent from the ensuing detailed description, and the novel features will be particularly pointed out in the appended claims.

SUMMARY OF THE INVENTION

In accordance with this invention, an improved technique is provided for recovering clock information from a received self-clocking digital signal, such as one which includes guaranteed transitions on a periodic basis, for example, a digital signal in which binary information is represented by a signal level transition at a mid-location of a bit interval. Pulses are generated at each signal level transition, and each generated pulse is delayed by a half bit interval and also by a full bit interval. The generated, half-bit and full-bit delayed pulses all are summed to recover the clock information. Typically, the recovered clock information exhibits a repetition rate that is twice the highest repetition rate of the digital signal.

As one aspect of this invention, the generated, half-bit and full-bit delayed pulses are summed in an OR circuit.

As another aspect, a pulse is generated at each signal level transition by delaying the received digital signal by an amount equal to the width of the generated pulses, and gating the delayed and undelayed digital signals. Preferably, the delayed and undelayed digital signals are gated by an exclusive-OR gate. Also, the last-mentioned delay imparted to the digital signal is less than a half bit interval and, preferably, is approximately equal to a quarter bit interval.

Yet another feature of this invention is to utilize the recovered clock information to resynchronize the received digital signal. Such resynchronization is achieved by writing each binary level included in the received digital signal into a memory at a write clock rate determined by the recovered clock information, and then reading out each stored bit at a reference read clock rate.

As one aspect of this feature, an error of at least predetermined magnitude between the write and read clock rates is sensed, and the read clock rate is adjusted in response to that error in a direction to minimize it.

As another aspect of this feature of the present invention, an addressable memory is used to store the binary levels of the received digital signal in successive write addresses as are generated in response to the recovered clock information. Also, successive read addresses (which differ from the write addresses at any given time) are generated in response to the read clock rate; and the difference between the write and read addresses is compared to determine when an adjustment in the read clock rate is necessary. A significant error in the compared addresses is indicative of loss of synchronism in the received digital signal, most probably due to data collision.

As yet another aspect of this feature of the present invention, write and read counters are used to generate the write and read addresses, respectively, and one of the write and read counters is preset to establish an initial difference between the counts thereof. Thus, a particular location from which a stored binary level is read always will differ from the memory location into which a binary level then is being written.

As another aspect of this feature, the reference clock is generated by an adjustable clock generator, such as a voltage controlled oscillator, whose repetition rate is adjusted as a function of the difference between the generated write and read addresses. As mentioned above, it is expected that these addresses differ by a predetermined amount. However, if the difference between the write and read addresses differs by less than that amount, the repetition rate of the oscillator is increased. Conversely, if the difference between these addresses is greater than the aforementioned predetermined amount, the repetition rate of the oscillator is reduced.

BRIEF DESCRIPTION OF THE DRAWINGS

The following detailed description, given by way of example, and not intended to limit the present invention thereto, will best be understood in conjunction with the accompanying drawings in which.

DETAILED DESCRIPTION OF CERTAIN PREFERRED EMBODIMENTS

Figure 1:
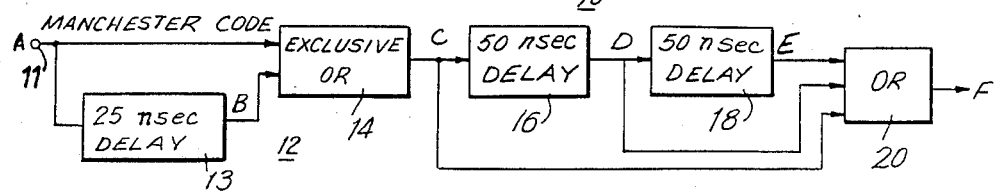
FIG. 1 is a block diagram of one embodiment of the clock recovery circuit of the present invention.

Referring now to the drawings, and in particular to FIG. 1, there is illustrated a block diagram of a preferred embodiment of the clock recovery circuit in accordance with the present invention. This circuit is adapted to recover the inherent self-clocking information included in digital signals of the type represented by, for example phase coherent code, Manchester code, or the like. It will be appreciated that the present invention recovers self-clocking information from a digital signal in which signal level transitions occur at some minimum periodicity, such as during bit intervals (for example, transitions at but not limited to the mid-locations of bit intervals). For convenience, and merely for the purpose of simplifying the present description, it will be assumed that a binary "1" is represented by a positive-going transition at a mid-location and a binary "0" is represented by a negative-going transition. With this format, it will be appreciated that only one transition occurs during every bit interval for the case of alternating bits (such as 10101010 . . . ) and two transitions occur during each bit interval when the same bit is repeated successively (such as 000 . . . or 1111 . . . ). For repeated bits in successive bit intervals, the same polarity transition occurs at the mid-location of successive bit intervals, and opposite polarity transitions are produced at the beginning of that bit interval. Examples of this encoded scheme are described below. Of course, the present invention may be used to recover clock information included in other self-clocking encoding schemes, such as alternate mark inversion code, split phase code, bi-phase code, or the like.

The clock recovery circuit 10 shown in FIG. 1 is comprised of a pulse generator 12, delay circuits 16 and 18 and a summing circuit 20. The pulse generator is adapted to generate pulses, such as positive-going pulses, in response to each signal level transition present in a received digital signal from which clock information is recovered. In this regard, an input terminal 11 is adapted to receive a digital signal; and this input signal is coupled to pulse generator 12. In the preferred embodiment, the pulse generator is comprised of a delay circuit 13 coupled to input terminal 11 and an exclusive-OR circuit 14 having two inputs, one coupled to input terminal 11 and the other coupled to the output of delay circuit 13. It will be appreciated that the time delay duration established by delay circuit 13 is determinative of the width of the pulses generated by pulse generator 12. This delay should be less than a half bit interval; and in the preferred embodiment, delay circuit 13 exhibits a time delay on the order of approximately one quarter bit interval.

Delay circuits 16 and 18 are adapted to impart half bit and full bit interval delays to the pulses produced by pulse generator 12. Accordingly, delay circuits 16 and 18 may be of similar construction, each exhibiting a time delay duration on the order of a half bit interval. Since delay circuits 16 and 18 are connected in cascade, the cumulative delay produced by both circuits is equal to a full bit interval and the delay produced by, for example, delay circuit 16 is equal to a half bit interval. If desired, delay circuits 16 and 18 may comprise a tapped delay line having a total time delay on the order of a full bit interval and a center tap from which a half bit interval delay may be derived. It is seen from FIG. 1 that each delay circuit is provided with an output terminal from which a delayed pulse may be derived. For convenience, delay circuit 16 may be thought of as providing first delayed pulses and delay circuit 18 may be thought of as providing second delayed pulses.

Summing circuit 20 is adapted to sum the pulses generated by pulse generator 12, the first delayed pulses provided at the output of delay circuit 16 and the second delayed pulses provided at the output of delay circuit 18. In the preferred embodiment, summing circuit 20 is formed as an OR-circuit having inputs connected to the outputs of pulse generator 12, delay circuit 16 and delay circuit 18, respectively. As will be described below, the output of OR-circuit 20 produces clock pulses of a frequency equal to twice the self-clocking frequency of the digital signal received at input terminal 11. That is, the repetition rate of the clock information recovered at the output of OR-circuit 20 is twice the highest repetition rate of the signal level transitions in the digital signal received at input terminal 11.

The manner in which clock recovery circuit 10 operates now will be described in conjunction with the waveform diagrams shown in FIGS. 2A–2F. The same reference letters are used in FIG. 1 to identify the waveforms shown in FIG. 2.

Figure 2A:
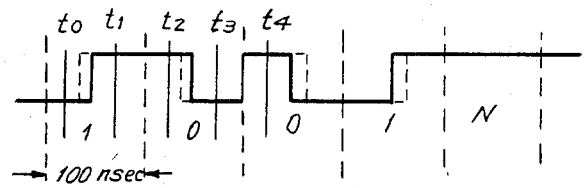
FIGS. 2A–2F are waveform diagrams representing the signals produced by various portions of the circuit shown in FIG. 1.

FIG. 2A represents successive bits 1001 encoded in Manchester code and applied to input terminal 11. In the absence of binary information, no signal level transitions are expected in the received digital signal, and this is indicated as "N". It is appreciated, from FIG. 2A, that the bit intervals are of substantially equal duration, that a binary "1" is represented as a positive transition at the mid-location of a bit interval and a binary "0" is represented as a negative transition. Of course, to provide for a negative transition in a bit interval which follows a negative transition, it is necessary for the digital signal to undergo a positive transition. This is represented as the positive transition at the end of the first of the repeated "0" bit intervals. It is seen from the waveform of FIG. 2A that the highest repetition rate included in the received digital signal is present when a bit is repeated in successive bit intervals. Merely for ease of explanation, it is assumed herein that each bit interval is on the order of 100 nsec. and, thus, the highest repetition rate included in the received digital signal is on the order of 10 M bits/sec.

Figure 2B:
Figure 2C:

The received digital signal is subjected to a time delay on the order of a quarter bit interval by delay circuit 13. Consistent with the numerical example assumed herein, delay circuit 13 imparts a time delay on the order of 25 nsec. FIG. 2B represents this delayed digital signal. The delayed digital signal (FIG. 2B) and the undelayed digital signal (FIG. 2A) are supplied to exclusive-OR circuit 14. As is conventional, the exclusive-OR circuit produces an output binary "1" level only when the levels of the signals supplied thereto differ from each other. FIG. 2C illustrates the output of exclusive-OR circuit 14. It is seen that a positive-going pulse is generated at each signal level transition included in the digital signal shown in FIG. 2A. Furthermore, the width of each generated pulse shown in FIG. 2C is determined by the time delay imparted by delay circuit 13. Thus, each generated pulse of FIG. 2C has a duration on the order of a quarter bit interval.

Figure 2D:

The generated pulses produced by exclusive-OR circuit 14 are delayed by a half bit interval as a result of the operation of delay circuit 16. Again, consistent with the example assumed herein, delay circuit 16 (as well as delay circuit 18) imparts a time delay on the order of 50 nsec. FIG. 2D illustrates the first delayed pulses produced by delay circuit 16, these pulses being delayed by a half bit interval from the pulses generated by exclusive-OR circuit 14 (FIG. 2C).

Figure 2E:
Figure 2F:

The first delayed pulses (FIG. 2D) produced by delay circuit 16 are subjected to a time delay of yet another half bit interval by delay circuit 18. FIG. 2E illustrates the second delayed pulses provided by delay circuit 18, and it is appreciated that these second delayed pulses (FIG. 2E) are delayed by a half bit interval from the first delayed pulses (FIG. 2D) and by a full bit interval from the pulses generated by exclusive-OR circuit 14 (FIG. 2C). OR circuit 20 is supplied with the pulses generated by exclusive-OR circuit 14 (FIG. 2C), the first delayed pulses which are delayed by a half bit interval (FIG. 2D) and the second delayed pulses which are delayed by a full bit interval (FIG. 2E). FIG. 2F illustrates the output of OR circuit 20 in response to these respective pulses supplied thereto. The resultant train of pulses produced by the OR circuit exhibits a repetition rate that is twice the highest repetition rate of the transitions included in the received digital signal (FIG. 2A), and this recovered clock information is on the order of approximately 20 M bits/sec. It is seen that the duration of each recovered clock pulse of FIG. 2F is equal to the duration of the pulses generated by exclusive-OR circuit 14, that is, a duration equal to a quarter bit interval. Of course, if desired, narrower clock pulses may be provided at the output of OR circuit 20 merely by reducing the delay imparted by delay circuit 13.

If desired, pulse generator 12 may comprise a conventional monostable multivibrator which, as is known, generates a pulse of predetermined width in response to each transition provided in the received digital signal. However, at the high repetition rates with which the present invention is intended to be used, the recovery time of such one-shot circuits might be too long and, thus, use of such circuits might not be satisfactory. However, other pulse generating circuits may be used to generate pulses in response to each digital signal level transition, such as differentiators, or the like.

The recovered clock information provided at the output of clock recovery circuit 10 may be used to re-synchronize the received digital signal which, as mentioned in the introductory portion of the instant specification, may be subjected to jitter, phase shifts, unpredicted time displacements, distortion and the like, due to interference, loss of signal power (due to the distance of transmission), and other factors known to affect or distort transmitted digital signals. FIG. 2A represents, in broken lines, examples of such phase shifts and time distortions in the received digital signal. It will be appreciated that, if such shifts accumulate, a signal level transition no longer will be present at the mid-location of a bit interval. Rather, the signal level transition might occur at the beginning (or end) of a bit interval and, as a result, the presence of binary information might not be detectable or, alternatively, because of cumulative phase or time shifts, the transition which occurred at the beginning of a bit interval will be sensed at the mid-location thereof. As a result, a binary "0" might be erroneously detected as a binary "1", and vice versa. It will be appreciated that, if serious time shifts are present in the digital signals shown in FIG. 2A, successive binary "0"s may be detected, erroneously, as a 01 or even as a 11.

Figure 3:
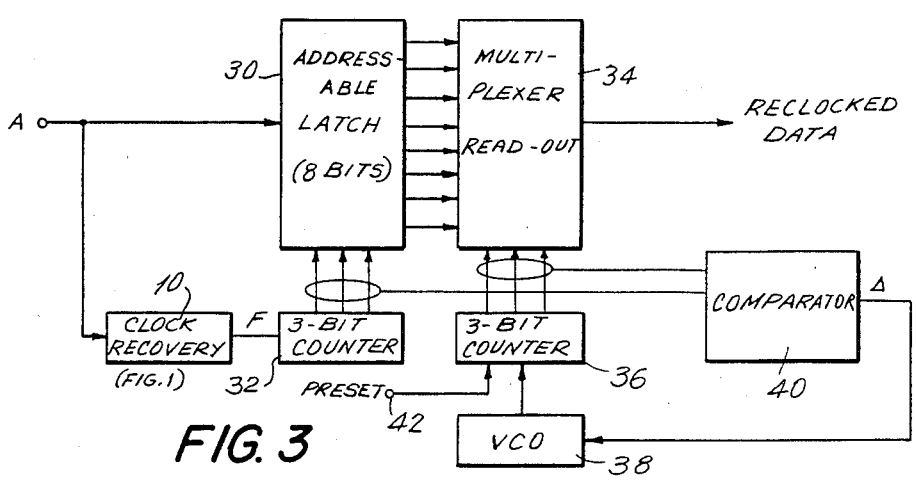
FIG. 3 is a block diagram of a re-synchronizing circuit in accordance with the present invention.

The circuit shown in FIG. 3 is adapted to re-synchronize the digital signal shown in FIG. 2A and, thus, prevent the accumulation of the aforementioned time shifts which would deleteriously distort the digital signal and make proper detection thereof difficult, if not impossible. The re-synchronizing circuit shown in FIG. 3 is comprised of clock recovery circuit 10 (discussed above with respect to FIG. 1), a storage circuit, or memory, 30, a memory read-out circuit 34, and a read-out control circuit formed of a read address generator 36, a reference clock 38 and a comparator 40. In the preferred embodiment, memory 30 is comprised of an addressable latch having the same number of storage locations as binary levels typically included in the digital signal to be re-synchronized. Merely for the purpose of explanation, if it is assumed that the received digital signal is formed as a byte comprised of eight bits, with each bit interval having two binary levels therein, addressable latch 30 includes at least sixteen addressable storage locations. If desired, a greater or even a lesser number of addressable locations may be included in the latch. Alternatively, memory 30 may be formed as a simple shift register into and through which the binary levels of the received digital signal are shifted. When constructed as a shift register, the clock signal recovered from the received digital signal and produced by clock recovery circuit 10 may be used as the shift register clock for shifting successive bit levels thereinto. In either embodiment of memory 30, it is seen that the negative transition, for example, of the recovered clock signal (FIG. 2F) occurs approximately in the middle of each half bit interval of the received digital signal (FIG. 2A). This has the effect of sampling the level of the digital signal just prior to and then following the mid-location of each bit interval, each sampled level being stored in memory 30. A change in the binary level stored in adjacent storage locations thus will be read out as a level transition at, of course, whatever the read-out clock rate may be.

When constructed as an addressable latch, a suitable address generator is provided to generate an appropriate address, thereby selecting the storage location of the addressable latch into which a received binary level is written. In this regard, a write-in address generator 32, formed as a 3-bit counter, is supplied with the recovered clock pulses to count those pulses. The count of 3-bit counter 32 is used as the write-in address; and as this count changes (or increments), the write-in address of latch 30 likewise changes. Counter 32 is illustrated as a 3-bit counter because this permits the count thereof to be incremented from 0 to 7, whereby the eight (as an example) storage locations 0 to 7 of latch 30 are addressed accordingly. If latch 30 is comprised of a greater number of storage locations, the counting capacity of counter 32 likewise will be increased so as to be matched thereto. For example, if latch 30 is provided with sixteen addressable locations, counter 32 may be formed as a 4-bit counter so as to generate successive addresses 0 to 15. Of course, since counter 32 is coupled to clock recovery circuit 10, the write-in addresses change in synchronism with the recovered clock information and, thus, in synchronism with the received digital signal.

Preferably, counter 32 is a cyclical counter which counts to a maximum or preset count and then "rolls over" to an initial count. In the illustrated embodiment, counter 32 rolls over from 111 to 000. Thus, the storage locations of latch 30 are addressed cyclically.

Read-out circuit 34 is coupled to memory 30 and, in the illustrated embodiment, preferably is comprised of a multiplexer. As is conventional, multiplexer 34 is provided with the same number of inputs as latch 30 is provided with addressable locations. As shown, each input of multiplexer 34 is coupled to a respective addressable location. However, one and only one of the inputs to multiplexer 34 is selected at any given time to be coupled through to its output. The particular input which is selected is determined by the read-out address produced by read address generator 36. Preferably, and as illustrated, address generator 36 is comprised of a counter; and in the embodiment discussed herein wherein latch 30 is provided 3-bit counter similar to aforedescribed 3-bit counter 32. Thus, depending upon the instantaneous count produced by counter 36, a corresponding read-out address is generated and the multiplexer input corresponding to that address (or, stated otherwise, the input identified by that address) is selected to be coupled to the multiplexer output. As a result, the bit stored in the addressable location of latch 30 which is connected to the selected input of multiplexer 34 is read out from the latch.

Reference clock 38 supplies reference clock pulses to counter 36. These reference clock pulses are counted by the counter; and the read-out address generated thereby thus is incremented at the repetition rate established by the reference clock frequency. Preferably, reference clock 38 is formed as a voltage controlled oscillator and, in the preferred embodiment, this oscillator is a voltage controlled crystal oscillator which exhibits high stability. Ideally, the repetition rate of the reference clock pulses supplied to counter 36 is equal to the repetition rate of the recovered clock pulses supplied to counter 32. It is expected, however, that the self-clocking information included in the received digital signal may vary from this value. Since the reference clock is formed as a voltage controlled oscillator, the repetition rate of the reference clock pulses may be adjusted such that variations in the recovered clock information may be accommodated. In this regard, comparator 40 is provided with an output coupled to the control input of voltage controlled oscillator 38. The comparator output signal serves as the frequency control signal to adjust the repetition rate of voltage controlled oscillator 38.

Comparator 40 is provided with two sets of inputs: one set coupled to counter 32 and the other coupled to counter 36. The purpose of comparator 40 is to compare the counts, or addresses, produced by these respective counters. That is, the comparator serves to compare the write-in address to the read-out address. It is expected that, during normal operation, the read-out address will lag behind the write-in address by a predetermined amount. For a purpose soon to be described, it is assumed that, when a received binary level is written into the fifth storage location of latch 30, the binary level which had been stored in the first storage location is read out therefrom by multiplexer 34. Thus, during normal operation, it is expected that the difference between the write-in and read-out addresses will have a numerical value of 4. Comparator 40 functions to insure that this numerical value is present. In the event that the write-in and read-out addresses differ from each other by more than or less than 4, a corresponding frequency control signal is supplied to voltage controlled oscillator 38 by comparator 40 to adjust the repetition rate of the reference clock pulses in a direction to return the difference between the addresses to 4.

Thus, the difference between the counts of counter 32 and counter 36 is indicative of loss of synchronization. In the numerical embodiment discussed above, if the difference between these counters is more than 4, it is assumed that the read-out operation lags behind the write-in operation and, thus, the repetition rate of the reference clock pulses is increased. Conversely, if the difference between the count of counter 32 and the count of counter 36 is less than 4, it is assumed that the read-out operation now leads the write-in operation, and the repetition rate of the reference clock pulses is reduced. The frequency control signal produced by comparator 40 functions to increase or decrease the reference clock repetition rate in the foregoing manner.

As mentioned above, it is preferable that when a bit is written into the fifth storage location of latch 30, the bit stored in the first storage location is read out. That is, when counter 32 is incremented to the count of 4, it is preferred that the count of counter 36 be equal to the count of 0. This is achieved by providing a preset signal to counter 36 to make certain that its initial, or preset count differs by a count of 4 from the initial count of counter 32. In this regard, a preset input of counter 36 is coupled to an input terminal 42 to receive the aforementioned preset signal. For example, this preset signal may be generated when the illustrated circuit first is energized.

In the event that memory 30 is constructed as a shift register, a read-out gate, such as an AND gate may be coupled to a desired stage, such as the fifth stage; and this AND gate may include another input coupled to receive the reference clock pulses produced by reference clock 38. When a received binary level thus is shifted to the fifth stage of this shift register, it is read out therefrom by the aforementioned AND gate at a repetition rate determined by the reference clock pulses which are supplied to this AND gate. Still, loss of synchronization may be achieved by supplying a counter similar to counter 32 with the recovered clock information, by supplying a counter similar to counter 36 with the reference clock information, and by comparing the respective counts produced by these counters. If the count differential is equal to 4, as in the aforementioned example, synchronization is present. However, if the count differential is less than or greater than 4, loss of synchronization is detected and the reference clock repetition rate then may be adjusted The manner in which the resynchronizing circuit illustrated in FIG. 3 operates now will be described. Let it be assumed that the digital signal illustrated in FIG. 2A is supplied to input terminal A and, from this input terminal, the digital signal is applied to the input of memory 30. This digital signal also is applied to clock recovery circuit 10 which operates to recover the self-clocking information included therein, as illustrated in FIG. 2F. Let it be further assumed that counter 32 initially is reset to a count of 000, thus generating the address of storage location 0 of memory 30. Consequently, at the middle of the first half-bit interval of the first bit interval (at time $t_0$) when the first binary level is supplied to the input of the memory circuit, this binary level is written into storage location 0. At the middle of the second half bit interval of the first bit interval, counter 32 is incremented to generate the address of storage location 1; and the binary level then supplied to memory 30 during this second half bit interval is written into location 1 (at time $t_1$). It is appreciated that, during successive half bit intervals, the count of counter 32 is incremented to the counts 2, 3, and so on during the middle portion of each. Thus, successive binary levels are written into locations 2, 3, and so on, as addressed by counter 32.

While counter 32 is incremented, counter 36 also is incremented in response to the reference clock pulses supplied thereto by voltage controlled oscillator 38. However, it has been assumed that the count of counter 36 is preset and, as a result, when the first binary level is written into storage location 0 of memory 30, the count of counter 36 will be equal to a count of 4. Assuming that the contents of memory 30 initially had been reset, no information is read, at this time, from storage location 4. However, when a received binary level eventually is written into storage location 4 of memory 30, counter 36 generates a count of 0, and multiplexer 34 thus reads the binary level stored in location 0 from memory 30. Then, when the next received binary level is written into storage location 5, the count of counter 36 is incremented and multiplexer 34 reads the binary level which had been stored in storage location 2. Thus, the write-in and read-out addresses are controlled such that the very same storage location is not simultaneously addressed for a write-in and a read-out operation.

In the event that the differential between the write-in and read-out addresses generated by counters 32 and 36 differs by less than 4, comparator 40 supplies a frequency control signal to voltage controlled oscillator 38 so as to decrease the repetition rate of the reference clock pulses. This restores the desired count differential between counters 32 and 36. Conversely, if the difference between the write-in and read-out addresses is greater than 4, comparator 40 supplies a frequency control signal to voltage controlled oscillator 38 so as to increase the reference clock frequency. Once again, the desired count differential is restored. Thus, it is appreciated that, if the digital signal supplied to input terminal A is subjected to frequency fluctuations, such fluctuations may be taken into account by adjusting the instantaneous repetition rate of the reference clock.

From the foregoing description, it is seen that, if the write-in and read-out addresses differ by more or less than 4, comparator 40 senses an error in the address differential. If the address differential is equal to 5, the error is equal to +1. Conversely, if the address differential is equal to 3, the error is equal to −1. Nevertheless, the frequency control signal fed back to voltage controlled oscillator 38 by comparator 40 functions to adjust the reference clock rate in a direction to null this sensed error.

Although not shown in FIG. 3, it will be appreciated that, if necessary, the recovered clock information may be used as a write-in clock (in addition to the write-in address) for the purpose of writing successive binary levels into memory 30. Likewise, the reference clock information may be used, in addition to the read-out address, to read out successive binary levels from memory 30.

It will also be appreciated that, as used herein, the term "successive" need not be limited solely to storage locations 0, 1, 2, 3, and so on. Rather, the first binary level may be stored in storage location 0, the second binary level may be stored in storage location 2, the third binary level may be stored in storage location 4, the fourth binary level may be stored in storage location 5, and so on. To avoid loss of information, it merely is necessary that the same order of storage locations into which the received binary levels are written is used to read those binary levels from memory 30.

Furthermore, although not shown in FIG. 3, it will be appreciated that, if desired, a suitable bit recovery circuit, or decoder, may be used to recover bit information from the received digital signal and to supply the recovered bit information in "1" and "0" form to memory 30. Consistent with this, the write clock rate should be one-half the recovered clock repetition rate. Likewise, the read clock rate will be one-half the aforedescribed reference clock repetition rate; and the read out bits will be supplied to an encoder to re-code the digital signal.

From the foregoing description, it is seen that comparator 40 functions to sense when the count differential between counters 32 and 36 differs by an amount other than a predetermined difference (assumed, in the numerical example described above, to be equal to 4). It is possible, however, that substantial interference is present at input terminal A. If the present invention is used to resynchronize data transmitted over a data bus that is accessible by several transmit and/or receive stations, it is possible that two or more stations may attempt to transmit concurrently onto that data bus. As a result, data from those stations will collide; and the digital signals then present on the data bus might be unintelligible, distorted information. In accordance with one preferred aspect of the present invention, such collisions are detected and, when sensed, information which may be written into memory 30 is not read out therefrom. Such collisions are sensed by comparator 40 merely by detecting when the differential between the write-in and read-out addresses differs substantially from the desired, predetermined amount. In the numerical example discussed above, if the count differential differs by less than 3 or more than 5, it is assumed that this has been caused by a collision.

While the present invention has been particularly shown and described with reference to a preferred embodiment, it will be readily appreciated that various changes and modifications may be made without departing from the spirit and scope of the invention. For example, memory 30 may include a greater number of addressable locations than has been numerically described above. Alternatively, a lesser number of addressable locations may be provided. For the purpose of the present invention, memory 30 may be thought of as including n addressable locations and, consistent therewith, counters 32 and 36 may be constructed as cyclical count-to-n counters to generate n write-in and read-out addresses, respectively. Still further, a decoder may be coupled to input terminal A to decode the bits represented by the level transitions in the received digital signals. The decoded bits then may be supplied directly to memory 30. Likewise, the output of multiplexer 34 may be coupled to a suitable encoder such that the respective bits which are read out from memory 30 then may be encoded to, for example, phase coherent code, Manchester code, or the like.

It will be appreciated that the appended claims should be interpreted to cover the foregoing as well as other equivalent changes and modifications.

What is claimed is:

1. A method of recovering clock information from a received digital signal in which binary information is represented by signal level transitions which are present on a periodic basis, such as transitions which occur at mid-locations of bit intervals, said method comprising the steps of generating a pulse of predetermined width at each signal level transition;

delaying said pulses by a half bit interval to provide first delayed pulses;

delaying the first delayed pulses by a half bit interval to provide second delayed pulses; and summing the generated and the first and second delayed pulses to recover said clock information.

2. The method of claim 1 wherein the repetition rate of the recovered clock information is twice the highest repetition rate of the signal level transitions in the received digital signal.

3. The method of claim 1 wherein said received digital signal is encoded in Manchester code format.

4. The method of claim 1 wherein positive and negative transition levels represent bits of opposite polarity.

5. The method of claim 1 wherein said step of summing comprises applying said generated pulse, said first delayed pulses and said second delayed pulses to an OR gate.

6. The method of claim 1 wherein said step of generating a pulse at each signal level transition comprises delaying the received digital signal by a time delay substantially equal to said predetermined width, and gating the delayed and undelayed digital signals.

7. The method of claim 6 wherein said step of gating comprises applying the delayed and undelayed digital signals to an exclusive-OR gate.

8. The method of claim 6 wherein the received digital signal is delayed by less than a half bit interval.

9. The method of claim 8 wherein the received digital signal is delayed by approximately a quarter bit interval.

10. A method for resynchronizing a received digital signal in which binary information is represented by signal level transitions having minimum periodicity, such as a signal level transition which occurs during at least some bit intervals, comprising the steps of:
recovering clock information from the received digital signal by generating a pulse at each signal level transition of the received digital signal; delaying the generated pulses by half and full bit intervals, respectively; and summing the generated pulses, the half bit interval delayed pulses and the full bit interval delayed pulses to recover said clock information;
writing binary level information included in the received digital signal into a memory at a write clock rate determined by the recover clock information;
reading said binary level information from said memory at a reference read clock rate;
sensing a present error of at least predetermined magnitude between the write and read clock rates in response to said recovered clock information; and
adjusting the read clock rate in a direction to null the sensed error.

11. The method of claim 10 wherein binary levels are written into respective write addresses of said memory and a binary level is concurrently read from a read address different from the write address.

12. The method of claim 11 wherein said step of writing includes generating successive write addresses at said write clock rate; and said step of reading includes generating successive read addresses at said read clock rate.

13. The method of claim 12 wherein the generated write and read addresses differ from each other, at any given time, by a predetermined amount; and wherein the step of sensing an error comprises sensing if the generated write and read addresses differ from each other by more or less than said predetermined amount.

14. The method of claim 13 wherein the step of adjusting the read clock rate comprises reducing the read clock rate if the difference between the generated write and read addresses is more than said predetermined amount and increasing the read clock rate if said difference is less than said predetermined amount.

15. The method of claim 10 wherein the step of summing comprises applying to an OR gate the generated, the half bit interval delayed and the full bit interval delayed pulses.

16. A method of sensing loss of synchronization between a received digital signal and a re-clocked version of that digital signal, comprising the steps of:
generating clock pulses from the received digital signal by generating a pulse at each transition present in the received digital signal, delaying said pulses by a half-bit interval to provide first delayed pulses, delaying the first delayed pulses by a half bit interval to provide second delayed pulses, and summing the generated, the first delayed and the second delayed pulses to produce clock pulses;
writing successive binary levels of the received digital signal into respective storage locations of a memory at a rate determined by said generated clock pulses;
counting said generated clock pulses;
generating reference clock pulses;
reading successive stored binary levels from said memory at a rate determined by said reference clock pulses, thereby re-clocking the received digital signal;
counting said reference clock pulses; and
sensing, in response to a comparison of the counts of said generated and reference clock pulses, if the count of generated clock pulses differs from the count of reference clock pulses by more than a predetermined present amount.

17. The method of claim 16 further comprising the step of presetting one of the clock pulse counts to establish at initial difference between said counts.

18. The method of claim 17 wherein said initial difference is equal to said predetermined amount.

19. The method of claim 16 wherein said memory comprises an addressable memory for storing binary levels at addressed locations therein; wherein said step of counting the generated clock pulses comprises generating successive write-in addresses at a rate determined by said generated clock pulses; and wherein said step of counting the reference clock pulses comprises generating successive read-out addresses at a rate determined by said reference clock pulses.

20. The method of claim 19 wherein said step of writing includes writing successive binary levels of the received digital signal into the generated write-in addresses; and said step of reading includes reading stored binary levels from the generated read-out addresses.

21. The method of claim 20 further comprising the step of presetting the write-in and read-out addresses to differ from each other.

22. The method of claim 21 wherein said step of sensing if the count of generated clock pulses differs from the count of reference clock pulses comprises comparing the write-in address to the read-out address, and indicating loss of synchronization if the compared addresses differ by more than said predetermined amount.

23. Clock recovery apparatus for recovering clock information from a received digital signal in which binary information is represented by a signal level transition during a bit interval, comprising:
pulse generating means for generating a pulse in response to each signal level transition in the received digital signal;
delay means for delaying each generated pulse by a half bit interval and a full bit interval, respectively, to provide first and second delayed pulses; and
summing means coupled to said pulse generating means and said delay means for summing the generated pulse, the first delayed pulse and the second delayed pulse to recover said clock information.

24. The apparatus of claim 23 wherein said summing means comprises an OR-circuit.

25. The apparatus of claim 23 wherein said delay means comprises a first delay circuit supplied with said generated pulses to impart a half bit interval delay to said generated pulses, and a second delay circuit coupled to said first delay circuit for imparting a half bit interval delay to delayed pulses received from said first delay circuit.

26. The apparatus of claim 23 wherein said pulse generating means comprises a delay circuit supplied with said received digital signal for imparting thereto a delay less than a half bit interval, and an exclusive-OR circuit coupled to said delay circuit and also supplied with said received digital signal to produce said generated pulse.

27. The apparatus of claim 26 wherein the last-mentioned imparted delay is no more than ¼ bit interval.

28. The apparatus of claim 23 herein the signal level transition in said received digital signal represents binary information, and said signal level transition is at a mid-location of a bit interval.

29. The apparatus of claim 28 wherein a bit of one polarity is represented by a positive signal level transition at a mid-location of a bit interval and a bit of opposite polarity is represented by a negative signal level transition at a mid-location of a bit interval.

30. The apparatus of claim 28 wherein the repetition rate of the recovered clock information is twice the highest repetition rate of the signal level transitions in the received digital signal.

31. The apparatus of claim 23 wherein the received digital signal is encoded in Manchester code format.

32. In digital signal resynchronization apparatus, the combination comprising:
  input means for receiving a digital signal in which binary information is represented by a signal level transition during a bit interval;
  clock recovery means for recovering clock information from the received digital signal comprising pulse generating means for generating a pulse in response to each signal level transition in the received digital signal; delay means for delaying each generated pulse by a half bit interval and a full bit interval, respectively, to provide first and second delayed pulses; and summing means coupled to said pulse generating means and said delay means for summing the generated pule, the first delayed pulse and the second delayed pule to recover said clock information;
  storage means for storing respective binary levels of the received digital signal;
  write-in means responsive to the recovered clock information for writing said binary levels into said storage means;
  read-out means responsive to reference clock information for reading the stored binary levels out of said storage means; and
  sensing means for sensing a present loss of synchronism between said read-out means and said write-in means in response to said recovered clock information.

33. The combination of claim 32 wherein said storage means comprises an addressable memory for storing said binary levels, each binary level being written into and read out of a respective, addressable location.

34. The combination of claim 33 wherein said write-in means comprises a write address generator for generating successive memory write addresses.

35. The combination of claim 34 wherein said read-out means comprises a read address generator for generating successive memory read addresses, the read address generated at any given time differing from the write address generated at that time.

36. The combination of claim 35 wherein each of said write and read address generators comprise write and read counters whose counts represent the write and read address, respectively.

37. The combination of claim 36, further comprising preset means for presetting the initial count of one of said counters to differ from the initial count of the other counter.

38. The combination of claim 36 further comprising means for supplying the recovered clock information to said write counter and means for supplying reference clock information to said read counter.

39. The combination of claim 36 further comprising an adjustable reference clock for generating said reference clock information, said reference clock being coupled to said sensing means and responsive to loss of synchronism for changing said reference clock information in a direction to restore synchronism.

40. The combination of claim 39 wherein said sensing means comprises comparator means coupled to said write and read counters for detecting when the respective counts differ by an amount other than a predetermined amount.

41. The combination of claim 40 wherein said addressable memory includes n addressable storage locations and each of said counters comprises a cyclical count-to-n counter.

42. The combination of claim 32 wherein a signal level transition of one polarity in the mid-location of a bit interval represents a binary "1" and a signal level transition of opposite polarity in the mid-location of a bit interval represents a binary "0".

* * * * *